United States Patent
Marques (10) Patent No.: US 7,848,310 B1
(45) Date of Patent: *Dec. 7, 2010

(54) PROVIDING TRANSPARENT VIRTUAL PRIVATE NETWORK CONNECTIVITY ACROSS INTERMEDIATE NETWORKS

(75) Inventor: Pedro R. Marques, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/200,603

(22) Filed: Aug. 28, 2008

Related U.S. Application Data (63) Continuation of application No. 10/768,492, filed on Jan. 30, 2004, now Pat. No. 7,420,958.

(51) Int. Cl.
*H04L 12/28* (2006.01)
(52) U.S. Cl. ........................................ 370/351; 370/401
(58) Field of Classification Search ................... None
See application file for complete search history.

(56) References Cited

U.S. PATENT DOCUMENTS

| 6,463,061 | B1 | 10/2002 | Rekhter et al. | |
|---|---|---|---|---|
| 7,080,161 | B2 | 7/2006 | Leddy et al. | |
| 2004/0034702 | A1 | 2/2004 | He | |
| 2004/0223500 | A1 | 11/2004 | Sanderson et al. | |
| 2008/0198858 | A1* | 8/2008 | Townsley et al. | ............ 370/401 |
| 2008/0229095 | A1* | 9/2008 | Kalimuthu et al. | .......... 713/153 |

\* cited by examiner

*Primary Examiner*—Seema S Rao
*Assistant Examiner*—Rhonda Murphy
(74) *Attorney, Agent, or Firm*—Shumaker & Sieffert, P.A.

(57) ABSTRACT

A routing protocol, such as the Border Gateway Protocol (BGP), is extended in a manner that allows the protocol to opaquely carry routing attributes associated with an origin of a routing advertisement, e.g., a customer network of associated with a virtual private network (VPN). These attributes are carried within routing communications using a separate attribute set, and are automatically utilized when delivering the routing advertisement to other customer networks associated with the VPN. As a result, the customer networks are isolated from the routing attributes used within an intermediate network coupling the customer networks.

24 Claims, 8 Drawing Sheets

PROVIDING TRANSPARENT VIRTUAL PRIVATE NETWORK CONNECTIVITY ACROSS INTERMEDIATE NETWORKS

This application is a continuation of U.S. application Ser. No. 10/768,492, filed Jan. 30, 2004, the entire contents of which is incorporated herein by reference.

TECHNICAL FIELD

The invention relates to computer networks, and more particularly, to techniques for communicating routing information within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Numerous types of routers exist within the Internet. Network Service Providers (NSPs), for example, maintain "edge routers" that provide Internet access to customers. These provider edge (PE) routers may also provide additional services to customers, such as supporting Virtual Private Networks (VPNs). A VPN allows an enterprise to accomplish private connectivity between site networks over a public network, such as the Internet. By eliminating the need for dedicated lines between the site networks, VPNs yield substantial cost savings as compared to traditional private networks.

In general, a VPN securely connects multiple customer networks using the public network, and ensures privacy by creating "tunnels" through the public network. More specifically, the VPN employs a tunneling protocol, such as the Internet Protocol security (IPsec) protocol, or the Layer 2 Tunneling Protocol (L2TP), to create the tunnels. The tunneling protocols typically encrypt packets using common encryption schemes, such as symmetric-key encryption, to ensure the packets are not compromised during transport over the public network.

In a typical configuration, an external peering session is established between a PE router and a customer edge (CE) router within each of the customer networks. The PE routers and CE routers advertise routing information throughout the VPN via one or more routing protocols. For example, the PE routers and CE routers may exchange routing information using internal routing protocols, such as the Internal Border Gateway Protocol (IBGP), and/or external routing protocols, such as the External Border Gateway Protocol (EBGP).

In general, external and internal routing protocols specify a variety of attributes when advertising routes to aid receiving routers in performing route resolution and other routing functions. More specifically, in accordance with many conventional routing protocols, routers within the public network update and/or replace these attributes as routing information is advertised across the public network from one customer network of the VPN to another. As one example, routers associated with different autonomous systems (AS) may replace BGP attributes and update an AS path associated with an advertised route as the routing advertisement propagates through the public network.

In the context of a VPN, however, the modification of these attributes may be undesirable, may lead to incorrect operation, and is generally inconsistent with the principle that the remote customer networks operate as if as directly connected via a "virtual" network.

SUMMARY

In general, techniques are described for providing transparent VPN services to customers. More specifically, the techniques allow a routing protocol, such as the Border Gateway Protocol (BGP), to be extended in a manner that allows the protocol to opaquely carry attributes associated with an origin of a routing advertisement, e.g., a customer network of associated with a VPN. Moreover, these attributes are automatically utilized when delivering the routing advertisement to other customer networks associated with the VPN. As a result, the customer networks can effectively exchange routing information utilizing routing attributes as if the customer networks were directly coupled instead of virtually coupled through an intermediate network. In this manner, the techniques eliminate undesirable effects of routing attribute modification due to the intermediate network, e.g., the public network.

In accordance with the techniques described herein, an attribute set data type is defined for a routing protocol, such as BGP. The attribute set data type may be used to encode the original set of attributes, e.g., BGP attributes, received via a routing advertisement originating from a customer network.

The attribute set data type may, for example, be defined as an optional BGP path attribute. In particular, the attribute set data type may be defined as an optional transitive attribute that carries a set of BGP path attributes. In this configuration, the attribute set data type can include any BGP attribute that can occur via a BGP UPDATE message, except MP_REACH and MP_UNREACH attributes.

The attribute set data type is defined in an extensible manner that allows a variable number of routing attributes to be specified. For example, in one configuration, the attribute set data type is defined to include an AS number associated with the origin of the routing advertisement plus a variable length sequence of BGP path attributes. The attribute set data type is defined in a manner that causes the carried path attributes to be treated as opaque BGP data. As a result, routers and other network devices that do not support the extension ignore the additional path attributes.

In practice, a PE router receives a routing advertisement from an origin customer network of a VPN and stores the original routing attributes. The PE router forwards the routing advertisement, which may include replacing or updating the routing attributes, and encodes the original routing attributes within the defined attribute set data type. In this manner, the attribute set data type may be viewed as defining a separate attribute space dedicated to carrying the routing attributes associated with the origin of the routing advertisement. The separate attributes space may be a second attribute space separate from a first attribute space that normally stores attributes for a routing protocol session.

PE routers associated with the other customer networks of the VPN receive the routing advertisement and restore some or all of the original routing attributes stored in the separate attribute space, depending upon the peering session established between the PE routers and the associated customer networks. The PE routers communicate the routing advertisement with the restored attributes to CE routers associated with the customer networks. In this manner, the intermediate network infrastructure, i.e., the public network, is rendered transparent to the customer networks.

In one embodiment, a method comprises defining an attribute set data type for a routing protocol to store routing attributes associated with an origin of routing information, and communicating routing information between customer networks of a virtual private network and an intermediate network in accordance with the routing protocol and the attribute set data type to isolate the customer networks from routing attributes used within the intermediate network.

In another embodiment, a device comprises a control unit and an interface card. The control unit generates a message that includes routing information received from a customer network, and formats the message to advertise the routing information using a first attribute set. The control unit includes a second attribute set within the message to store routing attributes associated with the customer network. The device further comprises an interface card to communicate the message to an intermediate network that couples the customer network to one or more additional customer networks associate with a virtual private network.

In another embodiment, a device comprises an interface card to receive a routing communication that advertises routing information using a first attribute set associated with an intermediate network. The routing communication includes a second attribute set that stores routing attributes associated within a first customer network that originated the routing information. The device further comprises a control unit to format a message to advertise the routing information from the intermediate network to a second customer network using the second attribute set.

In another embodiment, a computer-readable storage medium comprises instructions. The instructions cause a programmable processor to receive a routing communication from a first customer network associated with a virtual private network. The routing communication advertises routing information using routing attributes associated with the first customer network. The instructions further cause the processor to forward a second routing communication to an intermediate network coupling the first customer network to a second customer network associated with the virtual private network. The second routing communication advertises the routing information using a first attribute set that stores routing attributes associated with the intermediate network, and includes a second attribute set to store the routing attributes associated within the first customer network.

In another embodiment, a computer-readable storage medium comprises instructions. The instructions cause a programmable processor to receive a routing communication from an intermediate network that couples a first customer network and a second customer network. The routing communication advertises routing information using a first attribute set that stores routing attributes associated with the intermediate network, and includes a second attribute set that stores routing attributes associated within the first customer network. The instructions further cause the processor to advertise the routing information from the intermediate network to the second customer network using the routing attributes associated with the first customer network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
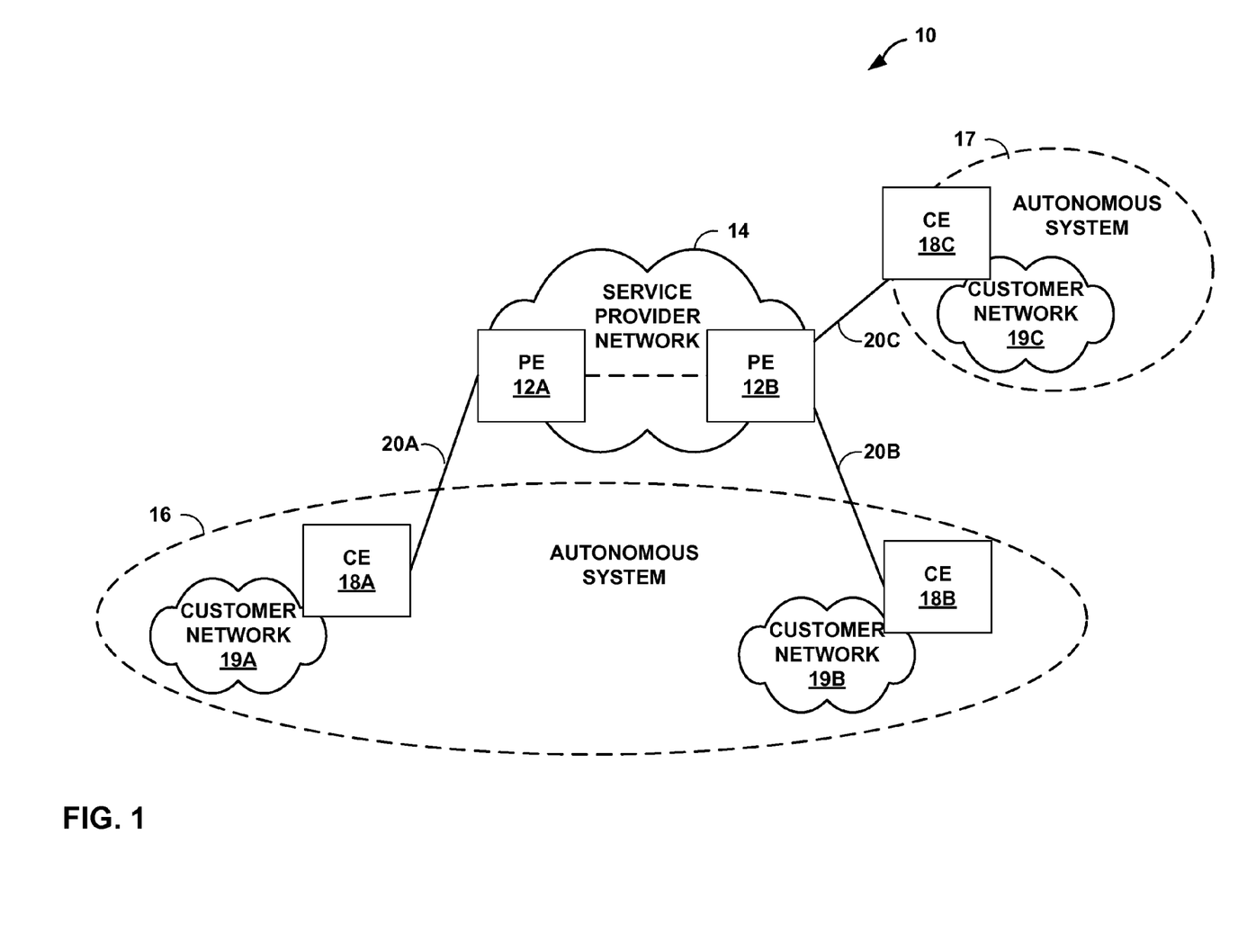
FIG. 1 is a block diagram illustrating a network environment in which provider edge routers support Virtual Private Network (VPN) services in accordance with the principles of the invention.

FIG. 1 is a block diagram illustrating a network environment 10 in which provider edge (PE) routers 12A and 12B (collectively, "PE routers 12") support Virtual Private Network (VPN) services in accordance with the principles of the invention. In the illustrated embodiment of FIG. 1, PE routers 12 establish a VPN between customer networks 19A, 19B and 19C (collectively, "customer networks 19"). In particular, PE router 12A provides VPN services to customer edge (CE) router 18A, while PE router 12B provides VPN services to CE routers 18B and 18C.

As shown in FIG. 1, customer networks 19A and 19B reside in a common autonomous system (AS) 16 and, therefore, share the same AS number. In contrast, customer network 19C resides in a separate AS 17, and has an AS number different from customer networks 19A, 19B. CE routers 18A-18C connect to PE routers 12A-12B via links 20A-20C (collectively, "links 20"). Links 20 may be digital subscriber lines, cables, T1 lines, T3 lines, or other network connections. In general, CE routers 18A and 18B are viewed as "internal peers" within the VPN as they both reside within AS 16. In contrast, CE router 18C is viewed as an "external peer" within the VPN.

CE routers 18 may exchange routing information with PE routers 12 in accordance with one or more internal or external routing protocols. Exemplary internal routing protocols include the Interior Border Gateway Protocol (IBGP), the Routing Information Protocol (RIP), or the Open Shortest Path First (OSPF) protocol. Exemplary external routing protocols include the External Border Gateway Protocol (EBGP, in some instance EBGP is referred to simply as BGP), the Exterior Gateway Protocol (EGP), or the Inter-Domain Routing Protocol (IDRP).

In accordance with the techniques described herein, PE routers 12 communicate in accordance with a routing protocol that has been extended in a manner that allows the protocol to opaquely carry routing attributes associated with an origin of a routing advertisement. More specifically, an "attribute set" data type is defined for the routing protocol to carry the original routing attributes. In other words, the attribute set data type may be viewed as defining a separate attribute space, i.e., a second attribute set, for carrying the original routing attributes. In this manner, the original routing attributes are carried through any intermediate network, e.g., service provider network 14, without modification. Service provider network 14 or any intermediate network may support Multi-Protocol Label Switching (MPLS) and PE routers 12 may enable MPLS tunnels in accordance with typical VPN practice.

PE routers 12 automatically utilize these attributes when advertising routing information to other ones of customer networks 19. As a result, customer networks 19 may exchange routing information in a manner that isolates the customer networks from routing attributes associated with any intermediate network, e.g., service provider network 14 and/or other public networks. Moreover, CE routers 18 are able to share routing information as if the CE routers directly maintained routing sessions, i.e., without being coupled by an intermediate network.

In one embodiment, the attribute set data type is defined as an optional BGP path attribute. In particular, the attribute set data type is defined as an optional transitive attribute that carries a set of BGP path attributes. In this configuration, the attribute set data type can include any BGP attribute that can occur via a BGP UPDATE message, except MP_REACH and MP_UNREACH attributes.

Moreover, the attribute set data type is defined in an extensible manner that allows PE routers 12 to store a variable number of routing attributes. For example, in one configuration, the attribute set data type is defined to include an AS number associated with the origin of the routing advertisement plus a variable length sequence of BGP path attributes.

As one example, PE router 12A may receive a routing advertisement from CE router 18A, i.e., an originating CE router. In response, PE router 12A generates a message that includes the routing information, and formats the message to advertise the routing information to PE 12B using a first attribute set that stores routing attributes associated with service provider network 14. In addition, PE router 12A includes a second attribute set within the message to store routing attributes associated with customer network 18A. PE router 12A then forwards the message to PE router 12B via the extended routing protocol.

Upon receiving the routing advertisement, PE router 12B restores some or all of the original routing attributes stored in the second attribute set, depending upon the peering session established between PE router 12B and the receiving CE router, e.g., CE router 18B or CE router 18C. For example, PE router 12B restores all of the original routing attributes when advertising the routing information to CE router 18B as CE router 18B is an internal peer to the VPN. However, as described in further detail below, PE router 12B restores a reduced amount of the original routing attributes when advertising the routing information to CE router 18C to reflect the external peering relationship with CE router 18C.

Figure 2:
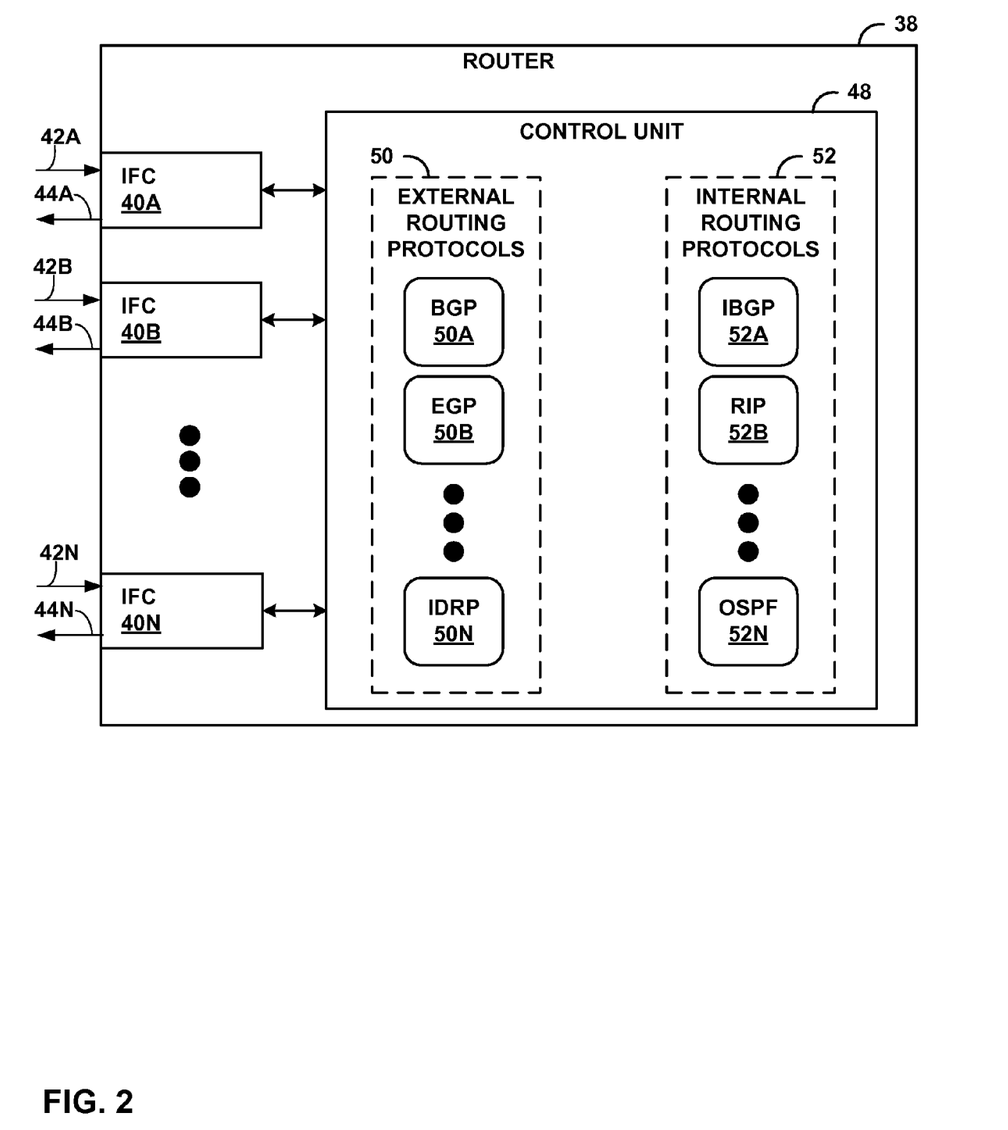
FIG. 2 is a block diagram illustrating an example embodiment of a router that provides VPN services in accordance with the principles of the invention.

FIG. 2 is a block diagram illustrating an example embodiment of a router 38 that provides VPN services in accordance with the principles of the invention. In the exemplary embodiment illustrated in FIG. 2, router 38 includes interface cards (IFCs) 40A-40N (collectively, "IFCs 40") for communicating packets via inbound links 42A-42N and output links 44A-44N.

In the illustrated embodiment, router 38 includes a control unit 48 that supports a set of external routing protocols 50A-50N (collectively, "external routing protocols 50") and internal routing protocols 52A-52N (collectively, "internal routing protocols 52"). Router 38 may communicate routing information via any of the supported external routing protocols 50 and internal routing protocols 52 in the form of routing advertisements. As described above, one or more of external routing protocols 50 and internal routing protocols 52 may be extended in accordance with the principles of the invention to support a second attribute set for opaquely communicating original routing attributes associated with a source of a routing advertisement.

For example, control unit 48 supports BGP 50A and IBGP 52A, either or both of which may be extended to define an attribute set data type for use in carrying the original routing attributes across an intermediate network, such as service provider network 14. BGP 50A and IBGP 52A may not be separate routing protocols and BGP 50A may define IBGP 52A. However, for purposes of illustration, BGP 50A and IBGP 52A may be thought of separate routing protocols, since control unit 48 may establish separate BGP sessions and IBGP sessions. While discussed in the context of the BGP and IBGP routing protocols, control unit 48 may support other routing protocols that can be similarly extended to opaquely carry a second attribute set.

As one example, control unit 48 may receive a routing advertisement via IBGP 52A from an origin customer network. Control unit 48 formats a BGP update message in accordance with BGP protocol 50A to advertise the routing information using a first attribute set, e.g., the conventional BGP attribute set. In addition, control unit 48 includes a second attribute set within the BGP message to include original attributes associated with the origin customer network.

In addition, control unit 48, may receive via one of IFCs 40 a routing communication that advertises routing information using a first attribute set associated with an intermediate network, and that includes a second attribute set that stores routing attributes associated within a first customer network that originated the routing information. In response, control unit 48 formats a BGP update message to advertise the routing information from the intermediate network to a second customer network, e.g., via IBGP protocol 52A.

Based on an AS number stored within the received separate attribute space and the established peer relationships with connecting CE routers, control unit 48 may restore some or all of the routing attributes stored in the separate attribute space prior to forwarding the BGP update message to the receiving customer network. In this manner, control unit 48 utilizes extended routing protocols BGP 50A and IBGP 52A to communicate attributes associated with the originating customer network, e.g., AS 16, across a public network.

In general, the functionality described in reference to control unit 48 may be implemented as executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. Moreover, the functionality may be implemented by executing the instructions of the computer-readable storage medium with one or more processors, discrete hardware circuitry, firmware, software executing on a programmable processor, or a combination of any of the above.

The architecture of router 38 illustrated in FIG. 2 is for exemplary purposes only. The invention is not limited to this architecture. In other embodiments, router 38 may be configured in a variety of ways. In one embodiment, for example, control unit 48 and its corresponding functionality may be distributed within IFCs 40. In another embodiment, control unit 48 may include a routing engine that performs route resolution and maintaining a routing information base (RIB), and a forwarding engine that performs packet forwarding based on a forwarding information base (FIB).

Figure 3:
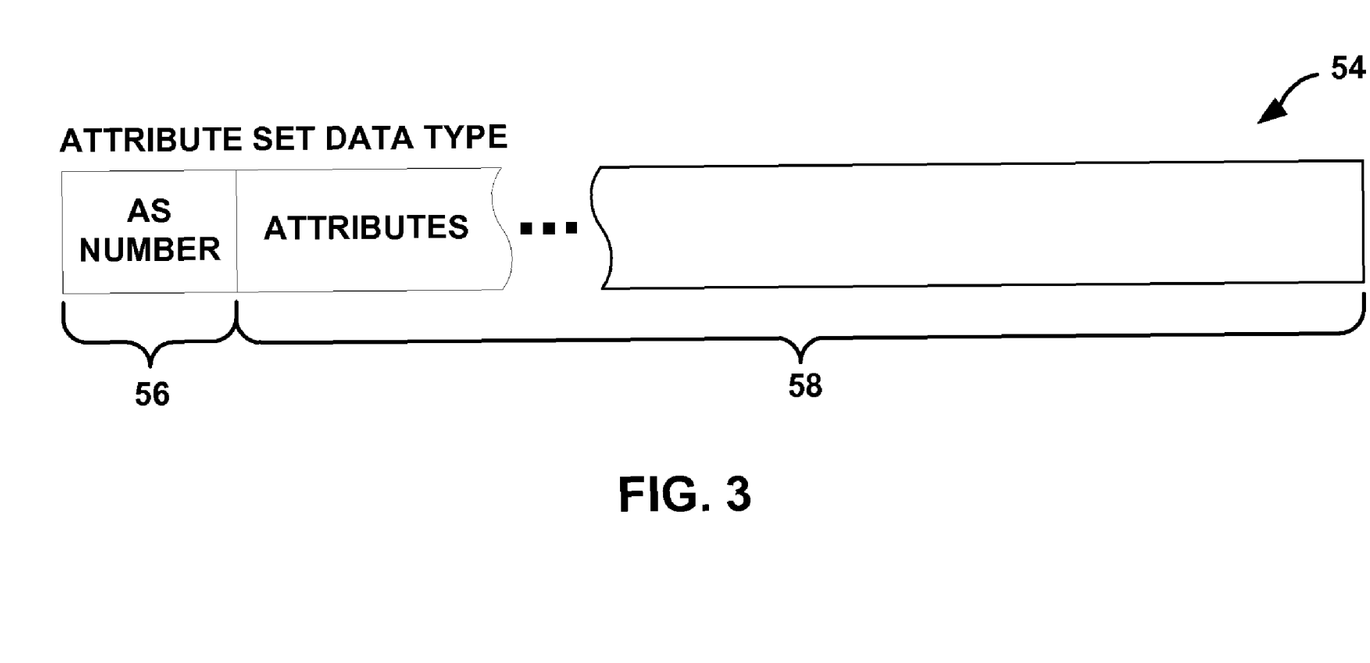
FIG. 3 is an example of a separate attribute space that is in accordance with the principles of the invention.

FIG. 3 is an example of an attribute set data type 54 suitable for storing original routing attributes in accordance with the principles of the invention. In the illustrated example, attribute set data type 54 comprises autonomous system (AS) number field 56 and attributes field 58. The position of AS number field 56 and attributes field 58 within attribute set data type 54, as shown, is for exemplary purposes, and attribute set data type 54 may define the positions of AS number field 56 and attributes field 58 in other arrangements.

AS number field 56 defines a space to store a four-byte AS number of the originating customer network that originally advertised the routing information. Attributes field 58 defines a space for a variable number of routing attributes associated with a routing protocol, such as BGP or IBGP attributes, used by the originating customer network when advertising the routing information.

Attribute set data type 54 may be defined by a user within an external routing protocol, an internal routing protocol, or both. For example, BGP 50A (FIG. 2) may define attribute set data type 54 as a BGP path attribute having an associated type code and name, e.g., "ATTR_SET." Consequently, a router, such as router 38, utilizes attribute set data type 54 as a separate attribute space to store a second set of attributes. In other words, router 38 may, for example, store attributes associated with an originating customer network to attribute set data type 54 as if attribute set data type 54 is a separate attribute space. The separate attribute space opaquely carries the attributes across intermediate networks.

While illustrated having both AS number field 56 and attributes field 58, attribute set data type 54 may comprise only attributes field 58 in accordance with the principles of the invention.

Figure 4:
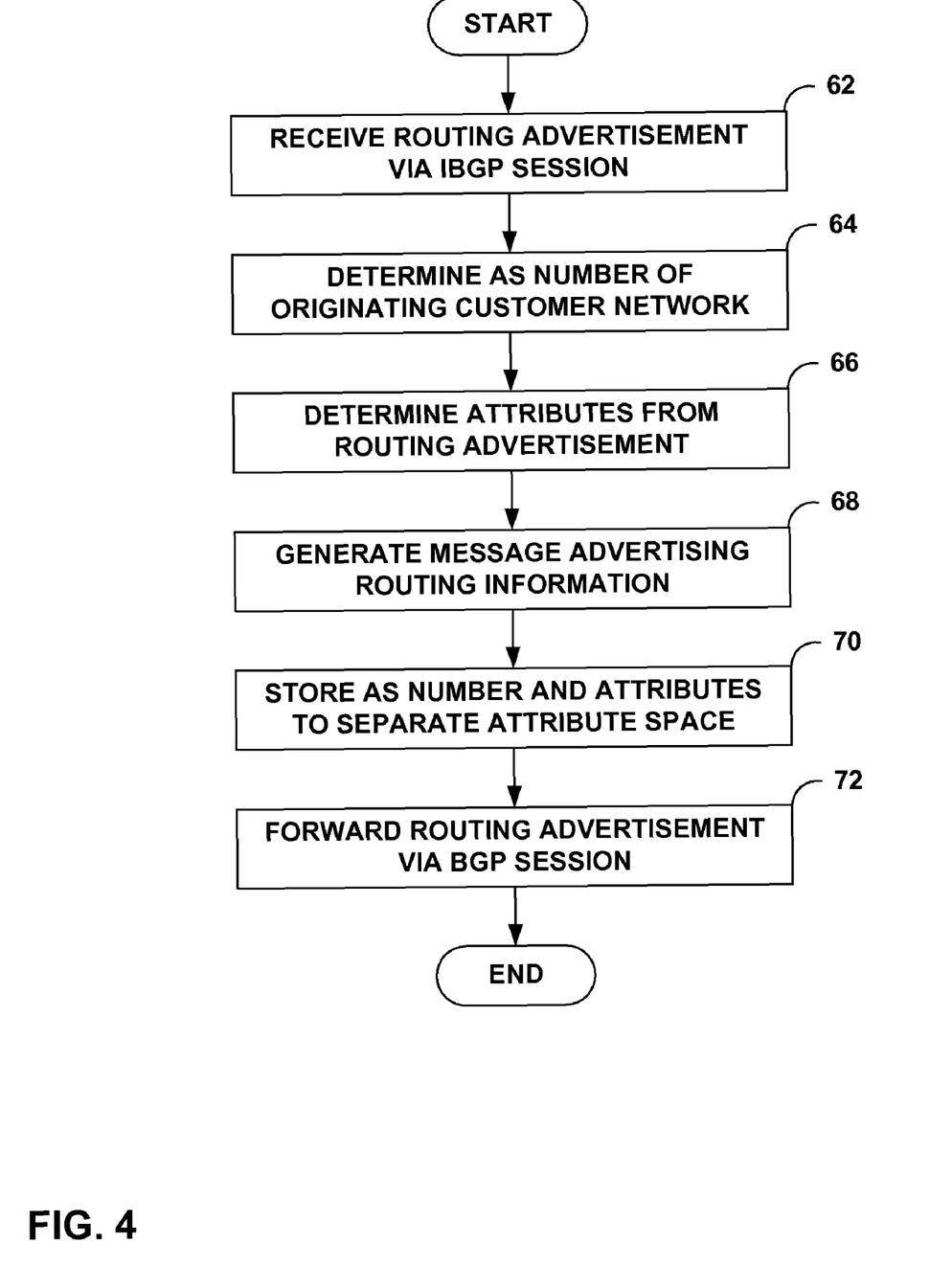
FIG. 4 is a flowchart illustrating exemplary operation of a PE router receiving a routing advertisement from a customer network and forwarding the routing advertisement to an intermediate network in accordance with the principles of the invention.

FIG. 4 is a flowchart illustrating exemplary operation of a device, e.g., a PE router, that utilizes an extended routing protocol in accordance with the principles of the invention. In particular, FIG. 4 illustrates exemplary operation of the PE router upon receiving a routing advertisement from a CE router associated with a virtual private network. For exemplary purposes, the PE router is discussed in reference to PE router 12A (FIG. 2).

Initially, PE router 12A establishes a routing protocol session, e.g., an IBGP session, with CE router 18A and receives a routing advertisement that includes routing information. In accordance with BGP, this routing advertisement utilizes attributes associated with the originating customer network 19A (62).

PE router 12A determines an AS number associated with the originating customer network, i.e., AS number 16 (64). PE router 12A also parses the routing advertisement to extract the routing attributes associated with the originating customer network 19A (66).

PE router 12A then generates a message to advertise the routing information to PE router 12B (68). For example, PE router 12A may generate a BGP update message in accordance with the BGP protocol to advertise the routing information using a first attribute set, e.g., the conventional BGP attribute set associated with service provider network 14. In addition, PE router 12A includes a second attribute set within the BGP message, and stores the attributes associated with the origin of the routing information, i.e., customer network 19A (70). Once the AS number and original attributes are stored in the separate attribute space of the BGP update message, PE router 12A forwards the routing advertisement to PE router 12B (72).

FIGS. 5-9 are flowcharts illustrating exemplary operation of a PE router receiving a routing advertisement having a defined separate attribute space to carry routing attributes associated with an origin of routing information in accordance with the principles of the invention. In general, FIGS. 5-9 illustrate that the PE router seeks to present to the customer networks a routing advertisement that contains the correct attributes based on the peering relationship of each of the customer networks to the virtual private network.

For example, with respect to FIG. 1, PE router 12B presents CE router 19B a routing advertisement that contains the same routing attributes received from CE router 19A since CE routers 19A and 19B are viewed as internal peers. In addition, PE router 12B presents CE router 19C a routing advertisement that corresponds to a situation where AS 16 and AS 17 have an external routing session between them. FIGS. 5-9 illustrate a set of rules to achieve this goal.

Figure 5:
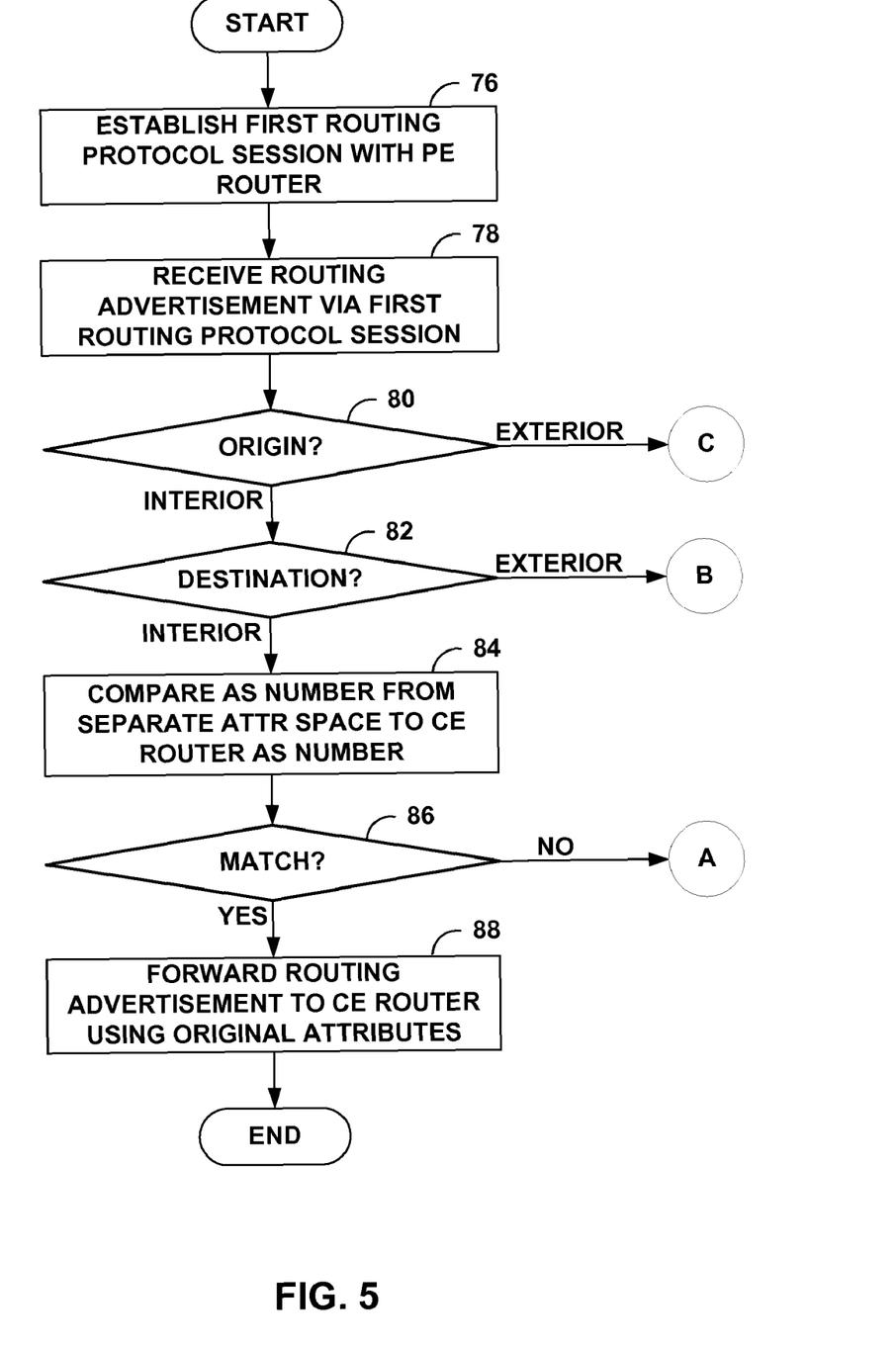
FIGS. 5-8 are flowcharts exemplary operation of a PE router receiving a routing advertisement from an intermediate network and forwarding the routing advertisement to a customer network in accordance with the principles of the invention.

As illustrated in FIG. 5, initially, PE router 12B establishes a first routing protocol session with PE router 12A (76) and receives a routing advertisement via the routing protocol session (78). In accordance with BGP, for example, the routing advertisement includes routing information and attributes associated with service provider network 14. In addition, the routing advertisement includes a separate attribute space as defined by attribute set data type 54 that carries the initial routing attributes associated with the originating one of customer networks, e.g., customer network 19A.

When PE router 12B advertises routing information that originated from an interior routing protocol, e.g., IBGP, to one of customer networks 19 via an interior routing protocol (INTERIOR branches of 80, 82), PE router 12B compares the AS number contained within the separate address space with the AS number of the customer network to which the routing information is being advertised (84). If the AS numbers match (YES of 86), such as with customer networks 19A and 19B that reside in AS 16, PE router 12B advertise the routing information to CE router 18B using the routing attributes contained within the separate attribute space, i.e., the routing attributes originally received from customer network 19A (88).

Figure 6:
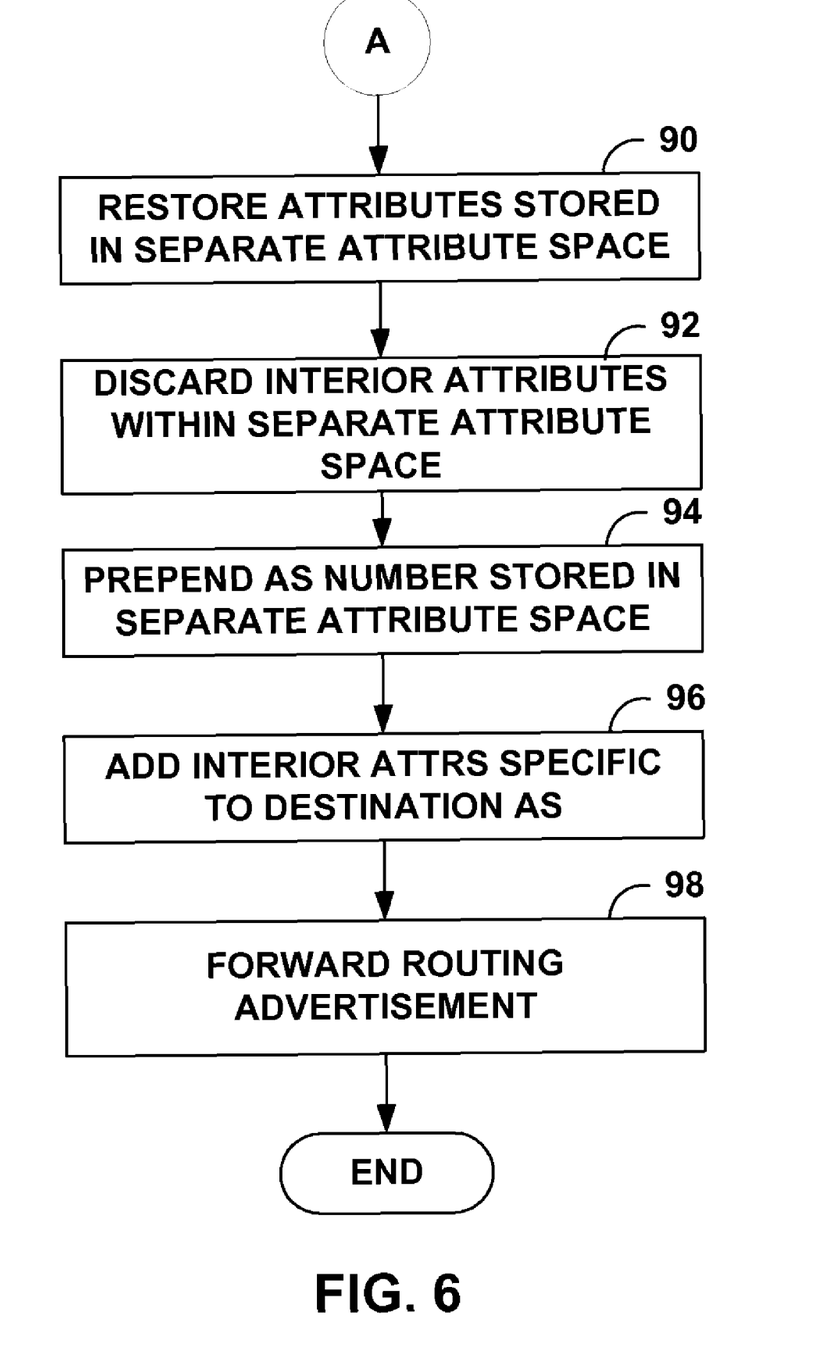

In the event the AS numbers do not match (NO of 86), PE router 12B first sets the path attributes for the advertisement to the attributes stored in the separate attribute space (90 of FIG. 6). Next, PE router 12B discards from the routing advertisement any internal routing protocol specific attributes within the second attribute space (e.g., BGP LOCAL_PREF, ORIGINATOR, CLUSTER_LIST) (92). PE router 12B also prepends the AS number stored in the separate attribute space (94), and finally adds any internal routing protocol attributes that are specific to the receiving AS, e.g., AS 17 (96). PE router 12A forwards the routing advertisement via the IBGP session (98).

Figure 7:
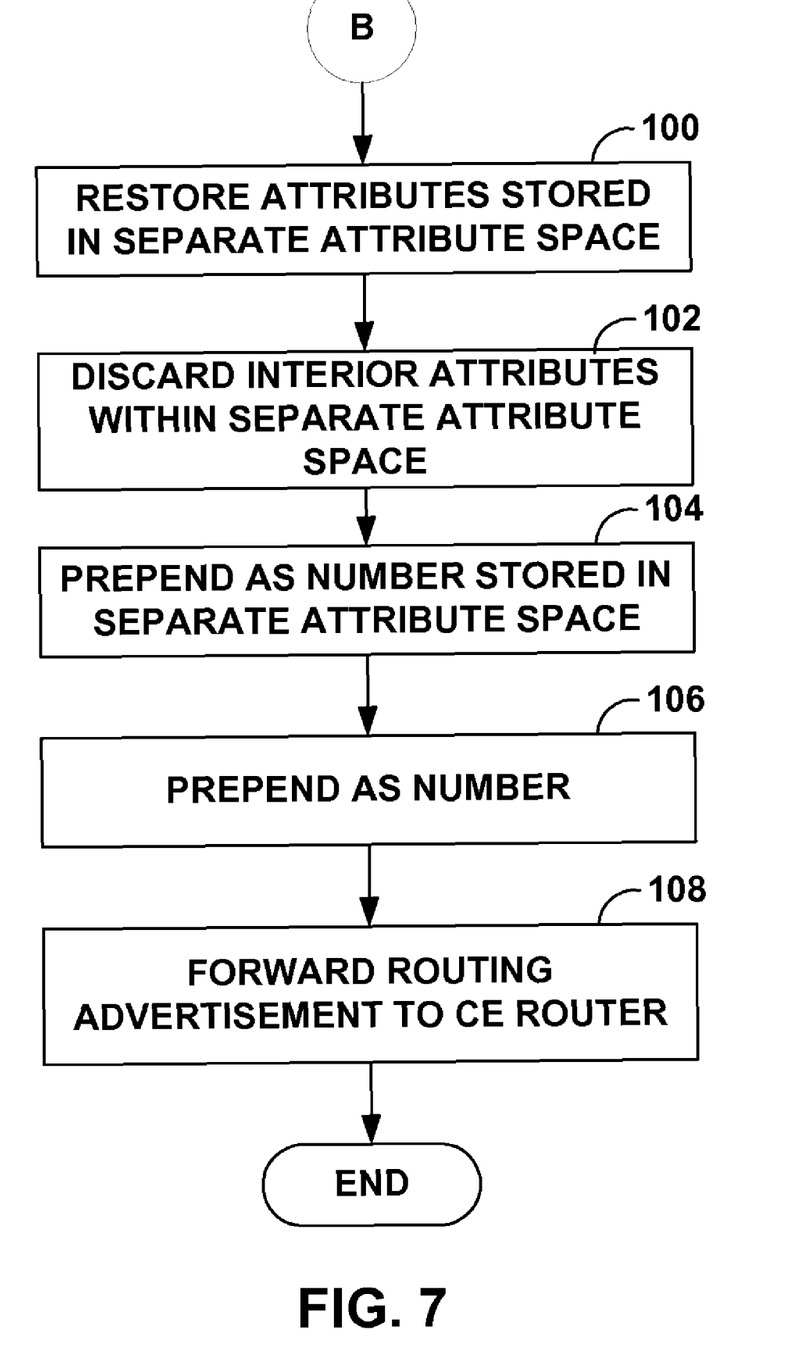

When PE router 12B advertises routing information originating from an interior routing protocol (INTERIOR of 80) to one of customer networks 19 via an exterior routing protocol (EXTERIOR branches of 82), such as to customer network 19C, PE router 12B first sets the path attributes for the advertisement to the attributes stored in the separate attribute space (100 of FIG. 7). Next, PE router 12B discards from the routing advertisement any internal routing protocol specific attributes within the second attribute space (102). PE router 12B also prepends the AS number stored in the separate attribute space (104). PE router 12B then prepends its own AS number, i.e., AS 16, to the routing advertisement. PE router 12B then forwards the routing advertisement with the restored attributes to CE router 19C via the exterior session (100).

Figure 8:
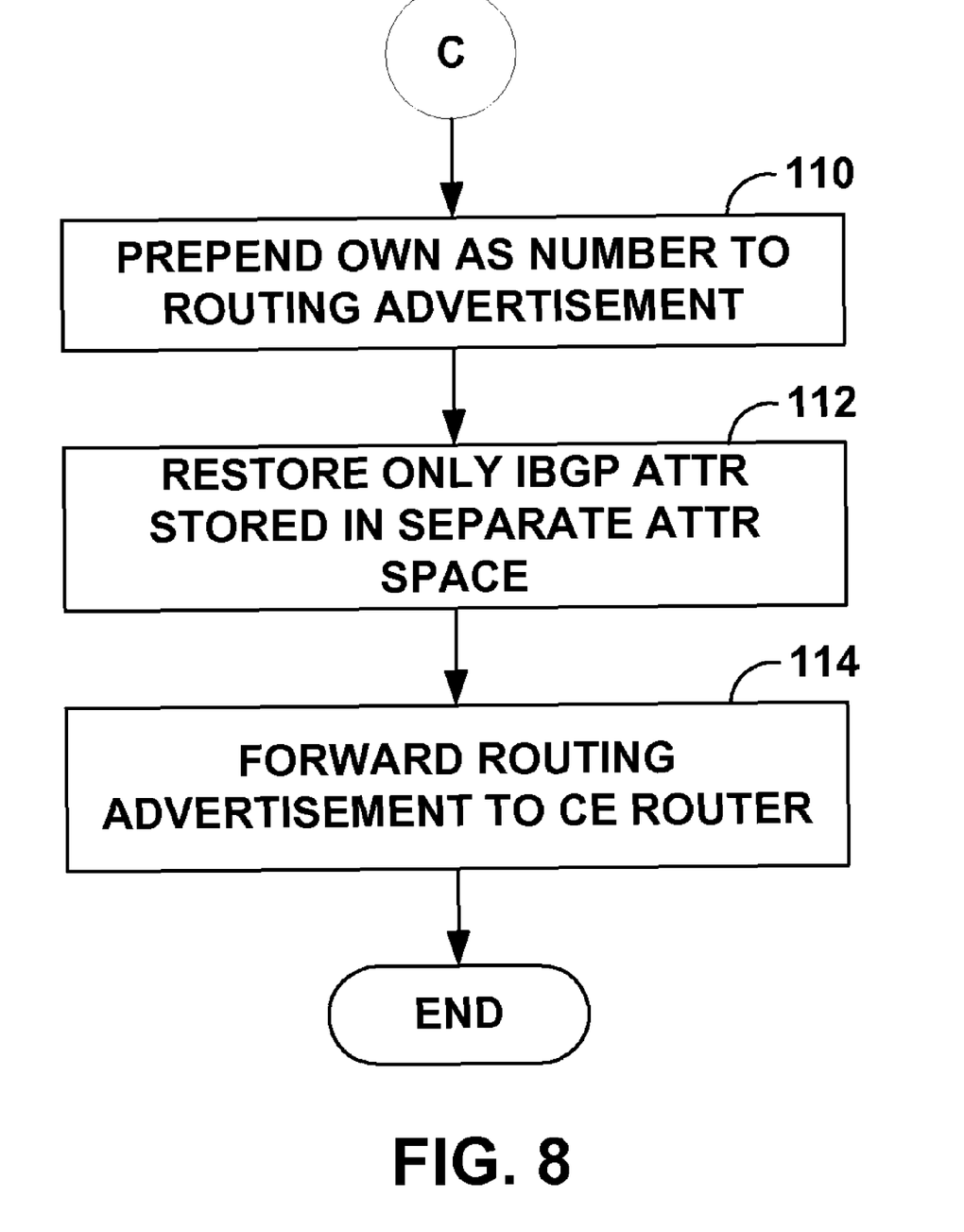

When PE router 12B advertises routing information originating from an exterior routing protocol (EXTERIOR of 80), PE router 12B first prepends its AS number, i.e., AS 16, to the routing advertisement (110 of FIG. 8). PE router 12B then restores only interior routing attributes, such as IBGP LOCAL_PREF, from the separate attribute space to the first attribute space of the routing advertisement (112). PE router 12B then forwards the routing advertisement (114).

While described above in the context of VPNs, the principles of the invention may apply to other networks. For example, a number of autonomous systems may link via intermediate network to form a virtual local network. In addition, although the techniques have been described as elements embodied within a network device, the described elements may be distributed to multiple devices. The term "system," is used herein to generally refer to embodiments of the invention in which the described elements are embodied within a single network device or distributed to multiple network devices.

Various embodiments of the invention have been described. These and other embodiments are within the scope of the following claims.

The invention claimed is:

1. A method comprising:
receiving, with a device located within a network intermediate to first and second customer networks of a virtual private network, a first routing message that advertises routing information specifying original routing attributes used within the first customer network, wherein the original routing attributes comprise routing attributes defined by a routing protocol, and wherein the first message advertises routing information using the original routing attributes and an autonomous system (AS) number used within the first customer network;
defining an attribute set data type for the routing protocol to store the original routing attributes used within the first customer network;
outputting, with the device located in the intermediate network, a second routing message that advertises routing information that includes both: (i) a first attribute set that specifies routing attributes used within the intermediate network, and (ii) a second attribute set in accordance with the attribute set data type that specifies the original routing attributes used within the first customer network, wherein the second routing message includes a second attribute set that further specifies the AS number used within the first customer network in accordance with the attribute set data type;
comparing the AS number of the first customer network with an AS number used within the second customer network; and
selectively utilizing the original routing attributes used within the first customer network instead of the routing attributes used within the intermediate network when communicating the routing information to the second customer network based on the comparison.

2. The method of claim 1, wherein communicating routing information further comprises communicating the routing information from the intermediate network to the second customer network using the original routing attributes used within the first customer network.

3. The method of claim 1, wherein defining the attribute set data type comprises defining the attribute set data type to allow a variable number of routing attributes to be specified.

4. The method of claim 1, wherein defining the attribute set data type comprises defining the attribute set data type to store an autonomous system (AS) number used within the origin of the routing information.

5. The method of claim 1, wherein selectively utilizing the original routing attributes comprises:
utilizing the original routing attributes used within the first customer network instead of routing attributes used within the intermediate network when the AS number used within the first customer network matches the AS number used within the second customer network; and
discarding at least a portion of the original routing attributes used within the first customer network when the AS number used within the first customer network does not match the AS number used within the second customer network.

6. The method of claim 1, further comprising:
determining whether the routing information originated from an interior routing protocol or an exterior routing protocol,
wherein outputting the second routing message includes outputting a second routing message to communicate the routing information from the intermediate network to the second customer network using the original routing attributes used within the first customer network in place of the routing attributes used within the intermediate network when the routing information originated from an interior routing protocol.

7. The method of claim 6, wherein outputting the second routing message includes: discarding at least a portion of the original routing attributes used within the first customer network; and
outputting the second routing message to communicate the routing information from the intermediate network to the second customer network using routing attributes used within the intermediate network when the routing information originated from an exterior routing protocol.

8. The method of claim 1, wherein the routing protocol comprises the Border Gateway Protocol (BGP), and defining the attribute set data type comprises defining an attribute set data type as an optional transitive BGP path attribute.

9. The method of claim 1, wherein defining the attribute set data type comprises defining an attribute set data type as opaque data that is carried through the intermediate network and only processed by routers that support the defined attribute set data type.

10. The method of claim 1, further comprising communicating the routing information from the intermediate network to the second customer network using the original routing attributes associated with the first customer network instead of the routing attributes associated with the intermediate network.

11. The method of claim 1, further comprising forwarding the second routing message to the intermediate network.

12. The method of claim 11, further comprising:
restoring the original routing attributes used within the first customer network in place of the routing attributes used within the intermediate network to generate a third communication that advertises the routing information; and
forwarding the third communication from the intermediate network to the second customer network using the restored attributes used within the first customer network.

13. A non-transitory computer-readable storage medium comprising instructions for causing a programmable processor to:

receive, with a device located within a network intermediate to first and second customer networks of a virtual private network, a first routing message that advertises routing information specifying original routing attributes used within the first customer network, wherein the original routing attributes comprise routing attributes defined by a routing protocol;

define an attribute set data type for the routing protocol to store the original routing attributes used within the first customer network;

determine whether the routing information originated from an interior routing protocol or an exterior routing protocol; and output, with the device located in the intermediate network, a second routing message that advertises routing information that includes both: (i) a first attribute set that specifies routing attributes used within the intermediate network, and (ii) a second attribute set in accordance with the attribute set data type that specifies the original routing attributes used within the first customer network, wherein the second routing message communicates the routing information from the intermediate network to the second customer network using the original routing attributes used within the first customer network in place of the routing attributes used within the intermediate network when the routing information originated from an interior routing protocol.

14. The non-transitory computer-readable storage medium of claim 13, wherein the instructions cause the processor to format the second attribute set as opaque data.

15. A non-transitory computer-readable storage medium comprising instructions for causing a programmable processor to:

receive a routing communication that advertises routing information from an intermediate network that couples a first customer network and a second customer network, wherein the routing communication advertises routing information that includes both: (i) a first attribute set that specifies routing attributes used within the intermediate network, and (ii) a second attribute set in accordance with an attribute set data type that specifies original routing attributes used within the first customer network and an autonomous system (AS) number used within the first customer network;

advertise the routing information from the intermediate network to the second customer network using the original routing attributes associated with the first customer network, wherein the routing attributes comprise routing attributes defined by a routing protocol, wherein the routing information is advertised to the second customer network in a format consistent with an interior routing protocol using the original routing attributes used within the first customer network when the AS number used within the first customer network matches an AS number used within the second customer network, and wherein the routing information is advertised to the second customer network in a format consistent with an exterior routing protocol when the AS number used within the first customer network does not match the AS number used within the second customer network.

16. The non-transitory computer-readable storage medium of claim 15, wherein the second attribute set of the routing communication specifies the original routing attributes associated with the first customer network as opaque data.

17. A network system comprising:

a virtual private network that includes a first customer network and a second customer network;

an intermediate network that couples the first customer network to the second customer network, wherein the intermediate network includes:

a first network device comprising:

a control unit to generate a message that includes routing information received from the first customer network, wherein the control unit formats the message to advertise the routing information using: (i) a first attribute set, and (ii) a second attribute set that specifies original routing attributes used within the first customer network, and wherein the original routing attributes comprise routing attributes defined by a routing protocol; and an interface card to communicate the message to the intermediate network that couples the first customer network to the second customer network; and a second network device that restores the original routing attributes used within the first customer network in place of the routing attributes used within the intermediate network to generate a communication that advertises the routing information and forwards the communication from the intermediate network to the second customer network using the restored attributes used within the first customer network.

18. The network system of claim 17, wherein the control unit formats the second attribute set to specify the original routing attributes used within the customer network as opaque data.

19. A method comprising:

defining, with a first device located within a network intermediate to first and second customer networks of a virtual private network, an attribute set data type for a routing protocol to store original routing attributes used within the first customer network;

receiving, with the first device located in the intermediate network, a routing message from a second device also located in the intermediate network, wherein the routing message advertises routing information that includes both: (i) a first attribute set that specifies routing attributes used within the intermediate network, and (ii) a second attribute set in accordance with the attribute set data type that specifies original routing attributes used within the first customer network, wherein the routing message includes a second attribute set that further specifies the AS number used within the first customer network in accordance with the attribute set data type;

comparing, with the first device, the AS number of the first customer network with an AS number used within the second customer network; and selectively utilizing, with the first device, the original routing attributes used within the first customer network instead of the routing attributes used within the intermediate network when communicating the routing information to the second customer network based on the comparison.

20. The method of claim 19, wherein selectively utilizing the original routing attributes comprises:

utilizing the original routing attributes used within the first customer network instead of routing attributes used within the intermediate network when the AS number used within the first customer network matches the AS number used within the second customer network; and discarding at least a portion of the original routing attributes used within the first customer network when the AS number used within the first customer network does not match the AS number used within the second customer network.

21. A method comprising:
receiving, with a device located within a network intermediate to first and second customer networks of a virtual private network, a first routing message that advertises routing information specifying original routing attributes used within the first customer network, wherein the original routing attributes comprise routing attributes defined by a routing protocol;
defining an attribute set data type for the routing protocol to store the original routing attributes used within the first customer network;
determining whether the routing information originated from an interior routing protocol or an exterior routing protocol;
outputting, with the device located in the intermediate network, a second routing message that advertises routing information that includes both: (i) a first attribute set that specifies routing attributes used within the intermediate network, and (ii) a second attribute set in accordance with the attribute set data type that specifies the original routing attributes used within the first customer network,
wherein outputting the second routing message includes outputting a second routing message to communicate the routing information from the intermediate network to the second customer network using the original routing attributes used within the first customer network in place of the routing attributes used within the intermediate network when the routing information originated from an interior routing protocol.

22. A method comprising:
receiving, with a device located within a network intermediate to first and second customer networks of a virtual private network, a first routing message that advertises routing information specifying original routing attributes used within the first customer network, wherein the original routing attributes comprise routing attributes defined by a routing protocol;
defining an attribute set data type for the routing protocol to store the original routing attributes used within the first customer network; and
outputting, with the device located in the intermediate network, a second routing message that advertises routing information that includes both: (i) a first attribute set that specifies routing attributes used within the intermediate network, and (ii) a second attribute set in accordance with the attribute set data type that specifies the original routing attributes used within the first customer network;
restoring the original routing attributes used within the first customer network in place of the routing attributes used within the intermediate network to generate a third communication that advertises the routing information; and
forwarding the third communication from the intermediate network to the second customer network using the restored attributes used within the first customer network.

23. A device located within a network intermediate to first and second customer networks of a virtual private network, the device comprising:
a control unit that defines an attribute set data type for a routing protocol to store original routing attributes used within the first customer network; and
an interface card that receives a routing message from another device also located in the intermediate network, wherein the routing message advertises routing information that includes both: (i) a first attribute set that specifies routing attributes used within the intermediate network, and (ii) a second attribute set in accordance with the attribute set data type that specifies original routing attributes used within the first customer network, wherein the routing message includes a second attribute set that further specifies the AS number used within the first customer network in accordance with the attribute set data type,
wherein the control unit compares the AS number of the first customer network with an AS number used within the second customer network and selectively utilizes the original routing attributes used within the first customer network instead of the routing attributes used within the intermediate network when communicating the routing information to the second customer network based on the comparison.

24. A device located within a network intermediate to first and second customer networks of a virtual private network, the device comprising:
an interface card that receives a first routing message that advertises routing information specifying original routing attributes used within the first customer network, wherein the original routing attributes comprise routing attributes defined by a routing protocol; and
a control unit that defines an attribute set data type for the routing protocol to store the original routing attributes used within the first customer network, determine whether the routing information originated from an interior routing protocol or an exterior routing protocol and output a second routing message that advertises routing information that includes both: (i) a first attribute set that specifies routing attributes used within the intermediate network, and (ii) a second attribute set in accordance with the attribute set data type that specifies the original routing attributes used within the first customer network,
wherein the control unit outputs the second routing message to communicate the routing information from the intermediate network to the second customer network using the original routing attributes used within the first customer network in place of the routing attributes used within the intermediate network when the routing information originated from an interior routing protocol.

* * * * *